Figure 1:
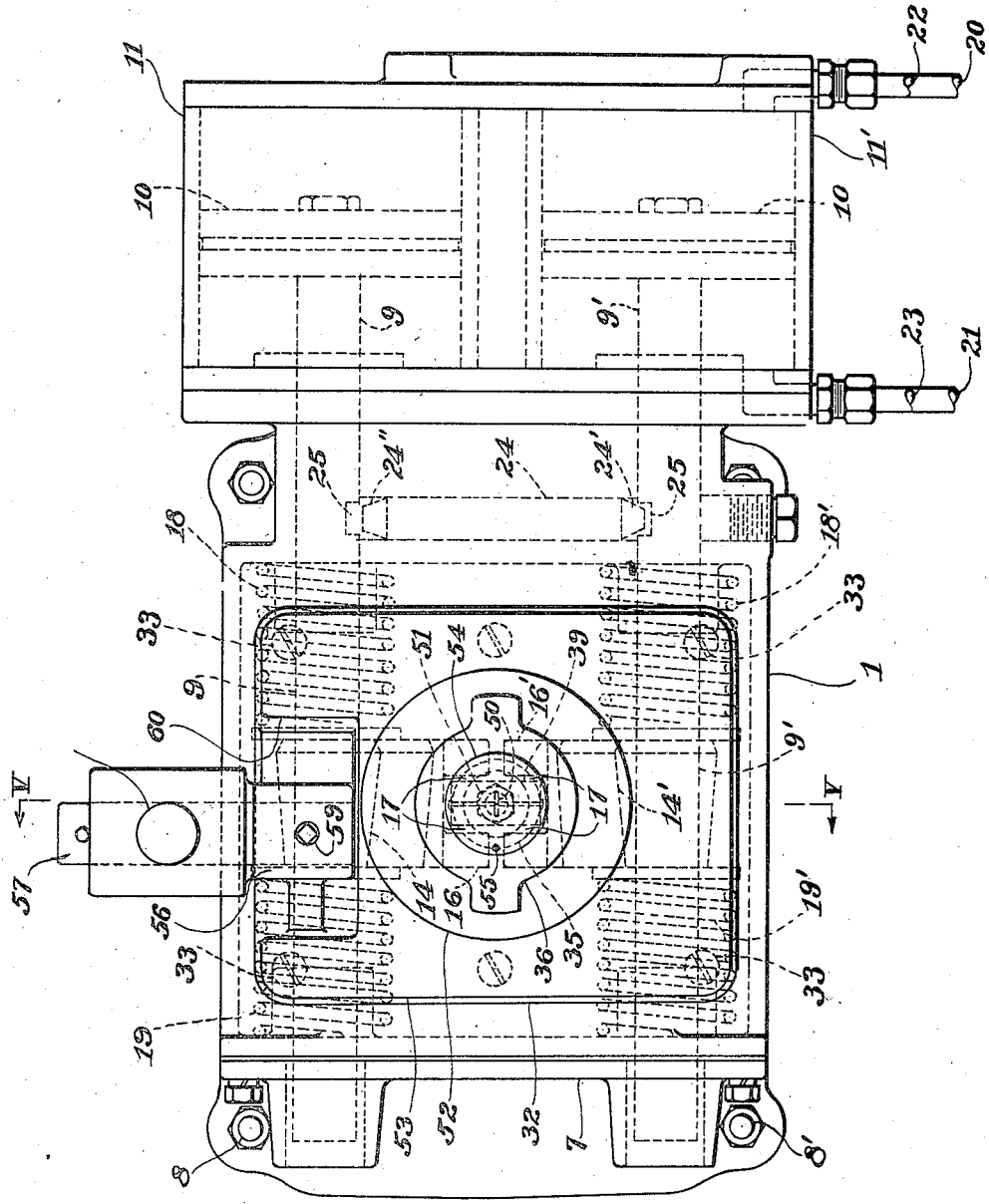

April 8, 1924.

E. G. FLANNERY 1,489,749

ANTITHEFT DEVICE FOR AUTOMOBILES

Filed July 14, 1923    3 Sheets-Sheet 1

WITNESSES
A. B. Wallace
C. R. Halbert

INVENTOR
Eugene G. Flannery
By Winter & Brown
His Attys.

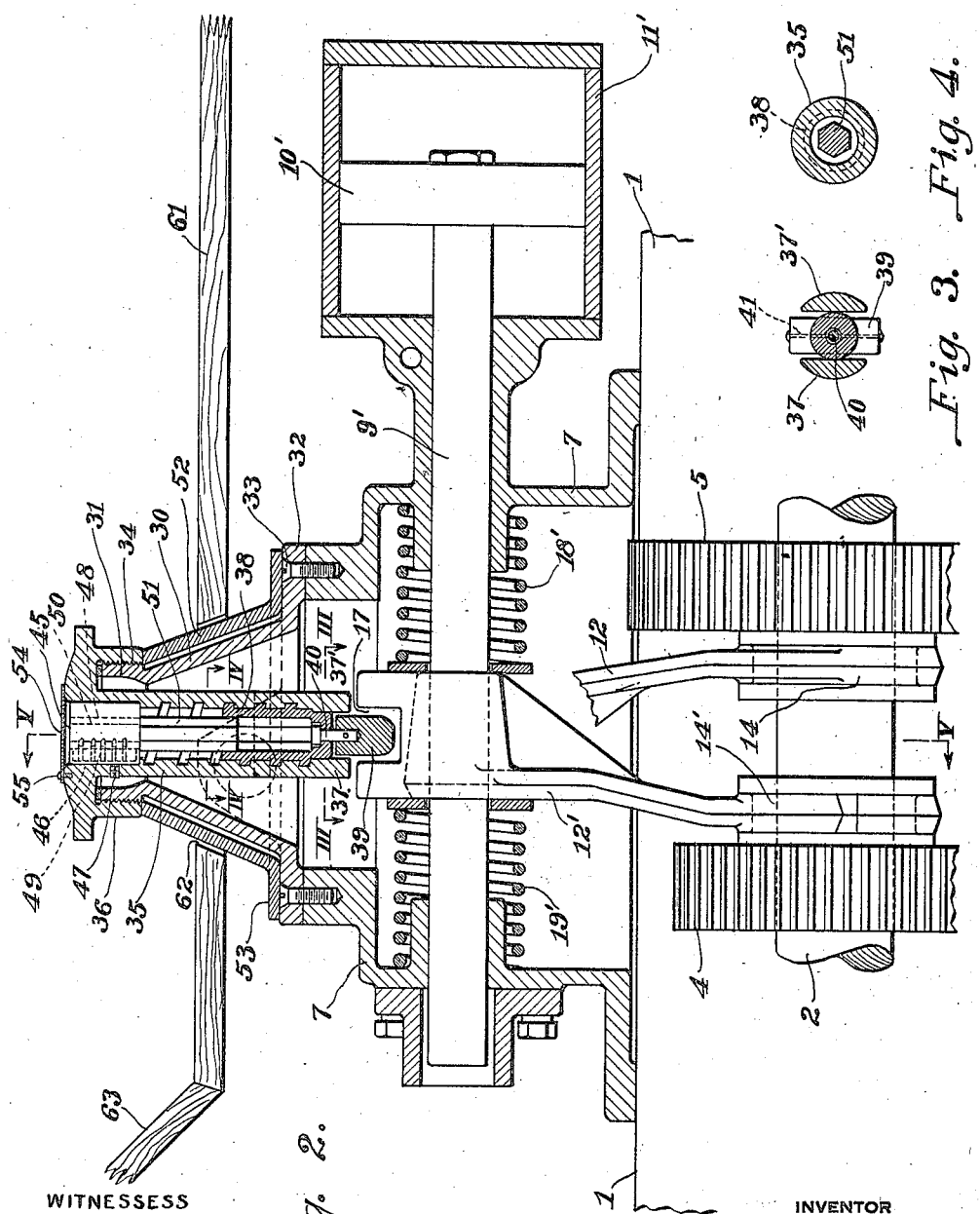

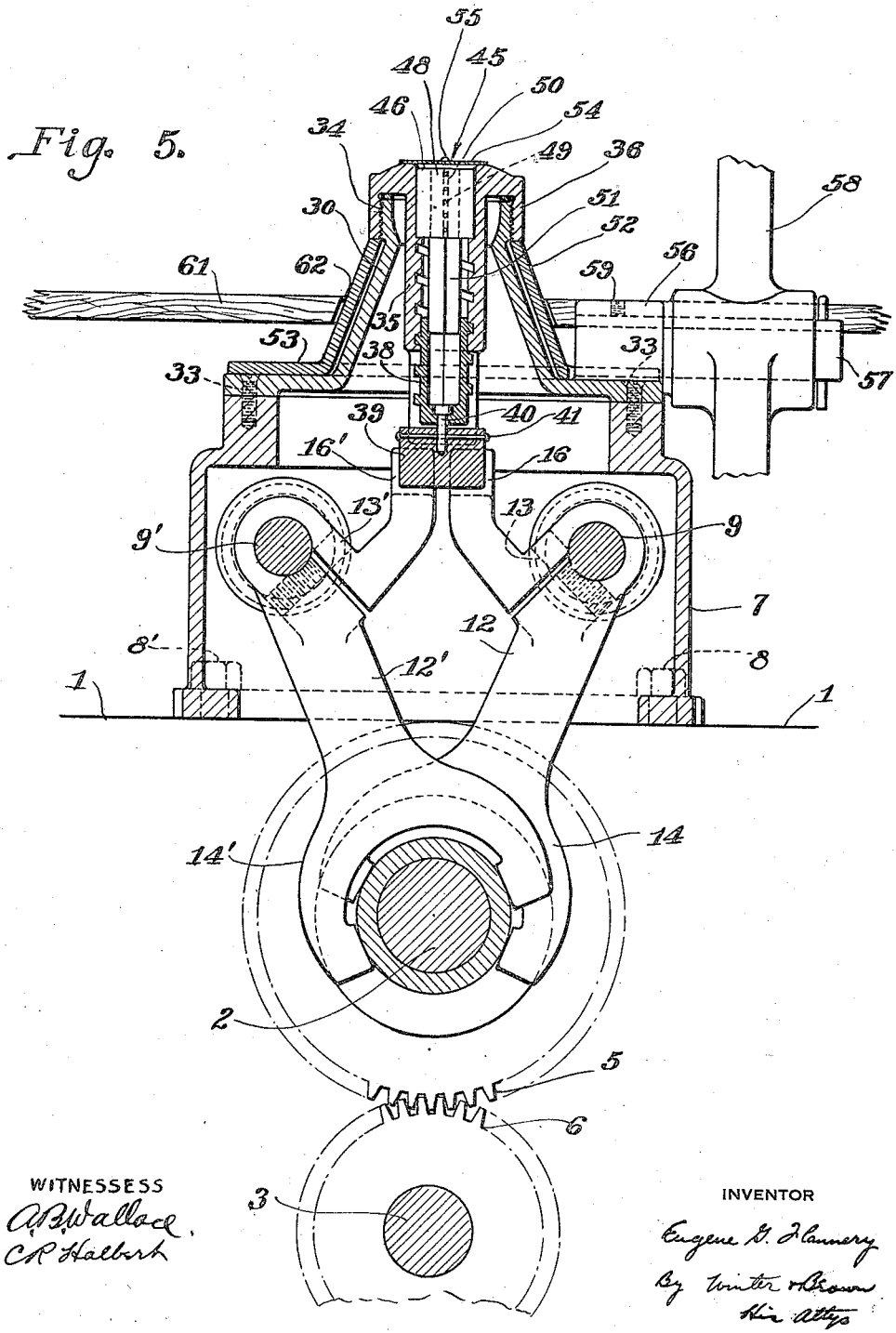

Patented Apr. 8, 1924.

1,489,749

UNITED STATES PATENT OFFICE.

EUGENE G. FLANNERY, OF PITTSBURGH, PENNSYLVANIA.

ANTITHEFT DEVICE FOR AUTOMOBILES.

Application filed July 14, 1923. Serial No. 651,526.

*To all whom it may concern:*

Be it known that I, EUGENE G. FLANNERY, a citizen of the United States, and a resident of Pittsburgh, in the county of Allegheny and State of Pennsylvania, have invented a new and useful Improvement in Antitheft Devices for Automobiles, of which the following is a specification.

This invention relates to anti-theft devices, and particularly to that type employed for locking the transmission gears of automobiles to prevent unauthorized use of the machine.

It is an object of the invention to provide an anti-theft device which is sturdy in construction but neat in appearance, which is conveniently located for manipulation by the driver, which can be readily applied and detached from the machine, and which may be furnished either as a part of the initial equipment or subsequently attached to equipment already in use with little difficulty.

It is a special object to provide an anti-theft device especially adapted for use in connection with machines equipped with automatic fluid actuated gear-shifting mechanism in which the usual gear shift lever projecting upwardly from the transmission gear case through the floor board is dispensed with, the improved anti-theft mechanism being superposed above the gear shifting unit and occupying the space usually employed for the gear shift lever.

It is another special object to provide an anti-theft device the parts of which form a unitary structure which may be fitted directly in the upper portion of the gear case cover for the transmission, in place of the gear shift lever.

It is a further special object to provide a construction having no exposed attaching or fastening devices and equipped with a protecting hood so formed that the same will effectively cover the fastening means employed for attaching the gear case cover to the transmission housing whereby to render it extremely difficult to remove or unlock the anti-theft in an unauthorized manner.

An additional further special object is to provide a device of the character referred to possessing the features above mentioned which is threadedly mounted upon the machine, which can be easily rotated upon its supporting threads when the relative positions of the several parts are such as to render the same inoperative for preventing actuation of the gear shifting mechanism, but which will be positively held against rotation whenever the said parts are moved into locking relation therewith.

These and other objects of the invention will more fully appear when taken in conjunction with the following description and the appended claims.

In the accompanying drawings Fig. 1 is a plan view illustrating the method of mounting the anti-theft device with relation to one type of fluid actuated gear-shifting mechanism; Fig. 2, a vertical sectional view taken through the parts illustrated in Fig. 1, showing the details of the anti-theft device together with the method in which it cooperates with the shifting forks of the gear-shifting mechanism; Fig. 3 a detailed sectional view taken on the line III—III of Fig. 2; Fig. 4 a similar view taken on the line IV—IV of Fig. 2; and Fig. 5 a transverse vertical sectional view taken substantially on the line V—V of Fig. 1.

The device forming the subject of this invention is primarily designed and intended for use in connection with fluid-actuated gear-shifting mechanisms of the type shown and described in the patents to Raymond F. Landis, Nos. 1,251,246, 1,298,227 and 1,336,084, granted December 25, 1917, March 25, 1919 and April 6, 1920, respectively. The fluid-actuated gear-shifting mechanism is customarily positioned directly above the ordinary transmission gears, being provided with suitable means operatively engaging the movable members of the gear-shifting mechanism with the gears of the transmission.

In the drawings, 1 represents the housing of the usual transmission gear case, and 2 and 3 the customary shafts of the transmission upon which the several transmission gears, such as indicated at 4, 5 and 6 are mounted in the usual manner, the gears 4 and 5 being associated with the shaft 2, and the gear 6 with the shaft 3. The remaining gears and details of the transmission mechanism is not illustrated, that shown being sufficient to clearly set forth the cooperation therewith of the several parts to be subsequently described.

Mounted directly above and supported upon the housing 1 is the gear housing 7 of the fluid-actuated gear-shifting mechanism, the said housing being suitably held in position by means of fastening devices such as the bolts 8, 8'. Mounted for reciprocating movement in the housing 7 is a pair of shifter shafts 9, 9'. These shifter shafts extend beyond the housing 7 at one end thereof and are provided with pistons 10, 10', respectively, which fit within the actuating cylinders 11, 11'. Attached to the shaft 9 about midway of the length of the housing 7 is a shifting fork 12, a similar fork 12' being likewise attached to the shaft 9'. These shifting forks may be attached to their shafts in any desired manner, in the present instance being illustrated as attached thereto by means of split sleeve portions which encircle the shafts and bound into intimate contact therewith by means of the bolts 13, 13', respectively. The lower portions of the shifting forks project downwardly and are provided at their lower extremities with forked yokes 14, 14' which are adapted to operatively engage annular grooves formed in extensions at the sides of the gears of the transmission mechanism in a well known manner. The upper portion of the shifting fork 12 is in the form of an arm which is bifurcated at its extreme upper end as indicated at 16, the upper portion of the shifting fork 12' being similarly constructed to provide the bifurcated extremity 16'. The ends of these arms lie in proximity of each other, and when the parts are in the relative positions which they assume when the shifting-mechanism is in its neutral condition, that is when the gears of the transmission mechanism are out of mesh, the bifurcations 16, 16', cooperate to form a recess 17. The shifter shaft 9 is normally urged to assume its neutral position under the influence of the coiled springs 18, 19, disposed between the opposite sides of the shifting fork 12 and the ends of the housing 7, while the shifter shaft 9' is likewise centered in neutral position by the springs 18', 19', disposed at opposite sides of the fork 12'. The relative dispositions of the parts as just described are best shown in Figs. 1 and 2.

In order to actuate the shifter shafts 9 and 9', for the purpose of moving the gears of the transmission into and out of operative engagement, the opposite ends of the cylinders 11 and 11' are connected with the suction intake of the motor by means of the pipes indicated at 20, 21, 22 and 23, the pipes 20 and 21 having communication with the opposite ends of the cylinder 11, while the pipes 22 and 23 establish communication with the opposite ends of the cylinder 11'. The pistons 10 and 10', with the gear shifting mechanism and the transmission gears in neutral position, occupy a point substantially midway of the length of their cylinders, and upon communication being established through the pipes 20 to 23, the suction effect of the motor will move the piston towards the ends of the cylinder in order to mesh the desired gears of the transmission, a pawl 24 being suitably mounted and adapted to have its tapered ends 24', 24" engage notches 25 and 25' in the respective shifter shafts, permitting the actuation of but one of the shifter shafts at once. The details of the construction and mode of operation of the shifting mechanism, as well as of the valve mechanism interposed between the pipes 20 to 23 and the suction inlet of the motor, are fully set forth in the patents to Landis, above mentioned, and for this reason need not be set forth herein at greater length, the construction of the shifting mechanism being merely described generally so as to set forth the cooperation between the anti-theft device forming the subject matter of this invention with this type of mechanism for which it has been especially designed, it being understood, however, that the invention is not intended to be limited to use in connection with such mechanisms, but is capable of use generally in a number of ways.

Surmounting and fixed to the upper portion of the housing 7 and covering an opening provided therein, is a conical gear case cover 30 provided at its upper end with an opening in the form of a socket 31, this socket being of a well known construction and forming the seat portion of a ball and socket joint for the reception of the portion provided on the gear shift lever customarily employed in connection with gear shifting mechanisms, the upper portion of the lever extending upwardly to be gripped by the operator while the lower portion thereof projects downwardly for operative engagement with the gear shifting mechanism. With the construction illustrated, the lower portion of the gear shift lever is adapted to extend within the recess 17 so as to be selectively moved for engagement with either of the shifting forks 12 or 12' in a well known fashion, and is intended to be employed in cases of emergency when the fluid actuated portion of the shifting mechanism is not in condition for operation. The gear case cover 30 is equipped adjacent its lower end with an annular flange 32 which rests immediately upon the upper surface of the housing 7 surrounding the opening therein and is adapted to be attached to the housing by any suitable attaching or fastening means such as the screw bolts indicated at 33, any suitable number of these attaching means being employed. The outer surface of the cover 30 immediately adjacent its upper extremity, is provided with the screw threads 34.

The locking mechanism for preventing unauthorized actuation of the gear-shifting mechanism and transmission gears, consists primarily of a cylindrical locking-bolt sleeve 35, the upper portion of which is flanged providing the overhanging internally threaded flange 36 which is adapted to be screwed upon the threaded portion 34 for supporting and positioning the locking mechanism in place. The bore of the sleeve 35 is internally threaded as indicated at 36, and the inner end of the sleeve provided with a slot extending inwardly from its extremity so as to provide the bifurcations 37, 37'. Operatively mounted within the threaded portion of the bore is an externally threaded sleeve 38 to the lower end of which is swivelled a locking-lug 39, the lug being swivelled to the sleeve 38 by means of the pin 40, the head of which seats upon the floor which is provided at the lower end of the sleeve and being fixed to the lug by means of the transverse pin 41. The lug 39 is preferably rectangular in cross section, as clearly shown in Fig. 3, and is adapted to fit between the bifurcations 37, 37', so as to be guided for longitudinal sliding but non-rotatable movement between the bifurcated lower portions of the sleeve 35. The inner or lower extremity of the sleeve 35 projects into close proximity of the bifurcated upper extremities of the shifting-forks 12, 12' so as to position the lug 39 directly above and in alignment with the recess 17 when the parts of the shifting mechanism are in their neutral position. The outer end of the bore of the sleeve 35 is closed by a lock indicated generally by the reference numeral 45 which is suitably fixed in position in any desirable way. Preferably, this lock will be of the so-called "Yale" type, and as shown, consists of an outer cylindrical barrel 46 which is firmly held in position by means of the set screw 47, and the inner rotatable barrel 48, the two barrels being operatively associated and cooperating with the tumblers 49 customarily employed in this type of lock, the key slot therefor being shown at 50. Fixed to the inner barrel so as to be rotatable therewith is a non-circular shaft 51 which depends within the bore of the sleeve 35 and has its lower end slidingly fitting within a correspondingly shaped bore within the sleeve 38, so that rotation of the shaft 51 will cause rotation of the sleeve 38 resulting in longitudinal movement of the said sleeve and lug 39, the sleeve 38, swivel 40 and lug 39 constituting the movable bolt portion of the locking mechanism.

Surrounding the cover plate or gear case cover 30 and interposed between the base flange 32 thereof and the lower edge of the overhanging flange 36 is a protecting hood 52, the hood corresponding in shape to cover plate 30 and being provided with the base flanged portion 53 which is adapted to seat over and cover the attaching or fastening devices 33 for securing the cover plate 30 to the housing 7. In order to prevent the entry of dust into the lock a disk 54 pivoted at one side as at 55 may be provided for closing the outer end of the bore of the sleeve 35. If desired, a supporting sleeve 56 may be formed at one side of the cover plate 30 in which to fix a stub shaft 57 for mounting the brake lever indicated at 58, the stub shaft being preferably held within the sleeve by means of the set screw 59, all as clearly shown in Fig. 5 of the drawings. With the brake lever supported in this manner, the cover plate 30 is cut away at one side as indicated at 60 in order to accommodate the several parts.

The flooring of the automobile is shown at 61, the same being provided with an opening 62 somewhat to the rear of the foot board 63 through which the upper portions of the anti-theft device are adapted to project as clearly shown in Figs. 2 and 5, these parts occupying the position customarily occupied by the gear shift lever, and consequently results in disposing the gear shift lever in the desired position when it is necessary to remove the locking mechanism and insert the emergency gear shift lever within the socket 31, as previously set forth.

The operation of the device will be obvious from the previous description. When the key of the lock 45 is inserted, rotation of the inner barrel 48 results in rotating the inner sleeve 38 due to its connection with the non-circular shaft 51. Rotation in one direction causes the sleeve 38 to rise carrying with it the lug 39 so as to withdraw the lug from the recess 17. With the lug withdrawn from the recess, the gear shifting mechanism may be freely actuated in order to shift the gears of the transmission in the customary manner. When it is desired to lock the shifting mechanism and transmission to prevent unauthorized use of the machine, the sleeve 38 is rotated in the opposite direction to lower the lug 39 causing the same to be projected within the recess 17, it being understood that the lug 39 is positioned immediately above and in alignment with the recess when the shifting mechanism has been placed in neutral position. After the lug has been projected within the recess, due to its engagement with the notches at the upper ends of both of the shifting forks, it is impossible to actuate the shifting mechanism until the lug is again withdrawn.

It is noted that when the locking mechanism proper consisting of the sleeve 35 and its overhanging flange 36, together with the parts directly associated therewith, is screwed upon the threaded portion 34, the lower edge of the flange 36 is brought into contact with the upper edge of the protecting hood 52 which is firmly pressed downwardly with its base flange 53 overlying the attaching or fastening devices 33. Consequently none of the attaching devices for the anti-theft device are exposed, rendering it extremely difficult to remove the same except in the intended manner by unscrewing the parts from the upper threaded extremity 34 of the cover plate. Due to the fact that when the lug is projected within the recess 17, it is impossible to rotate the sleeve 35, the association of the parts not only serves to lock the shifting mechanism against unauthorized actuation, but also serves to prevent unauthorized removal of the anti-theft device itself. After the key has been inserted in the lock 45, and the lug 39 withdrawn from the recess 17, the anti-theft device can be readily removed by merely unscrewing the same from the threaded portion 34 in an obvious manner. The fact that the method of mounting the parts results in not only serving as an effective means for preventing unauthorized use of the machine but to prevent unauthorized removal of the anti-theft device itself is considered of great practical importance and commercial value.

Should the gear-shifting mechanism used in connection with the machine get out of order for any reason so that it cannot be actuated in its normal manner, it is merely necessary to unscrew the sleeve 35, and insert the gear shifting lever within the socket 31 so as to serve as an emergency gear shift until the fluid-actuated shifting mechanism has been repaired.

It is thus seen that the invention provides an anti-theft device which is sturdy in construction but neat in appearance, one which can be readily applied and removed from the machine, which can be easily attached to machines already in use, which is constructed so as to be mounted not only to serve its primary purpose of preventing unauthorized use of the machine, but which co-operates with its associated mechanism in such manner as to prevent unauthorized removal of the device itself, and one which lends itself to the convenience of the operator in permitting the easy insertion of an emergency gear shift lever whenever desired.

I claim:

1. An anti-theft device comprising a supporting member rigidly held in position by attaching means, a flanged locking-bolt sleeve threadedly engaging the said supporting member, a lock-bolt operatively engaging the said sleeve, a cover plate interposed between the flange of the sleeve and attaching means, the cover plate being adapted to cover and protect against tampering the said attaching means when the sleeve is threaded into operative position upon the supporting member.

2. An anti-theft device comprising a conical supporting member rigidly held in position by attaching means and provided with exterior threads thereon, a locking-bolt sleeve having interior threads engaging the exteriorly threaded portion of the supporting member, a lock-bolt within the sleeve, and a protecting hood superposed upon the supporting member and covering the said attaching means, the said hood being held in operative position by the said sleeve.

3. An anti-theft device comprising a conical supporting member rigidly held in position by attaching means and provided with exterior threads thereon, a locking-bolt sleeve provided with an interiorly threaded overhanging flange adjacent its outer end engaging the exteriorly threaded portion of the supporting member, a lock-bolt mounted within the sleeve, a hood corresponding in shape to the supporting member superposed thereon and covering the said attaching means, the said overhanging flange abutting the hood for holding the same in operative position.

4. An anti-theft device comprising a supporting member, an interiorly threaded lock-bolt sleeve fixed thereto, a lock-bolt mounted within the sleeve for longitudinal movement with respect thereto comprising an exteriorly threaded internal sleeve engaging the interior threads of the first named sleeve, and a lug swivelled to the said internal sleeve, a lock fixed in the outer end of the bore of the first named sleeve, and operative connections between the said lock and bolt whereby actuation of the lock will move the said bolt.

5. An anti-theft device comprising a supporting member, an interiorly threaded lock-bolt sleeve fixed thereto and provided with an inner slotted end, an externally threaded sleeve engaging the internal threads of the first named sleeve, a lug swivelled to the last named sleeve and guided for longitudinal movement but held against rotation by the said slotted end, a lock fixed in the outer end of the bore of the first named sleeve, and operative connections between the said lock and bolt.

6. An anti-theft device comprising a supporting member, an interiorly threaded lock-bolt sleeve fixed thereto and provided with an inner slotted end, an externally threaded sleeve engaging the internal threads of the first named sleeve, a lug swivelled to the last named sleeve and guided for longitudinal movement but held against rotation by the said slotted end, the last named sleeve being provided with a non-circular recess, a lock fixed in the outer end of the bore of the first named sleeve comprising a rotatable barrel normally held against rotation but freely rotatable upon the insertion of the key of the lock, and a non-circular rod fixed to the said barrel and slidably but non-rotatably engaging the said recess whereby rotation of the lock barrel will produce longitudinal movement of the said last named sleeve and lug.

7. In combination with a gear mechanism and a housing therefor, a cover plate for the housing, attaching means for fastening the cover plate to the housing, the cover plate being provided with an exteriorly threaded portion, a locking-bolt sleeve provided with an internally threaded flanged portion engaging the said exterior threads, a lock-bolt mounted within the sleeve adapted to be projected into and out of locking relation with the gearing within the said housing, a lock fixed in the outer end of the bore of the sleeve operatively connected with the said bolt, and a protective hood superposed on the cover plate and covering the said attaching means, said hood being held in position by the flanged portion of the sleeve whereby to prevent access to the attaching means.

8. In combination with a gear-shifting mechanism for automobiles comprising shifting forks provided with bifurcated extremities which when the parts are in their neutral positions lie in proximity of each other and form a recess, a conical cover plate for the said mechanism provided with a socket-opening, a locking mechanism comprising a terminal flange fixed to the cover plate and an inwardly projecting internally threaded sleeve extending through the said opening and terminating in proximity of the recess. A second sleeve externally threaded and engaging with the threads of the first named sleeve, a lug swivelled to the last named sleeve and guided for longitudinal but non-rotatable movement with respect to the first named sleeve, the path of movement of the said lug being in alignment with the recess formed by the bifurcations of the forks when in neutral position and adapted to be projected within and withdrawn from the said recess, a key actuated lock fixed within the open end of the bore of the first named sleeve and operative connections between the said lock and second named sleeve for rotating the same.

In testimony whereof, I sign my name.

EUGENE G. FLANNERY.